United States Patent [19]

Haendle

[11] 4,442,538

[45] Apr. 10, 1984

[54] X-RAY DIAGNOSTIC INSTALLATION

[75] Inventor: Joerg Haendle, Erlangen, Fed. Rep. of Germany

[73] Assignee: Siemens Aktiengesellschaft, Berlin & Munich, Fed. Rep. of Germany

[21] Appl. No.: 421,283

[22] Filed: Sep. 22, 1982

[30] Foreign Application Priority Data

Oct. 22, 1981 [DE] Fed. Rep. of Germany ....... 3141987

[51] Int. Cl.³ ............................................. G03B 41/16
[52] U.S. Cl. ...................................... 378/146; 378/99
[58] Field of Search ................... 378/146, 99; 358/111

[56] References Cited

U.S. PATENT DOCUMENTS 4,366,574 12/1982 Hill ...................................... 378/146

Primary Examiner—Craig E. Church

Attorney, Agent, or Firm—Hill, Van Santen, Steadman & Simpson

[57] ABSTRACT

An X-ray diagnostic installation has an X-ray tube which emits a fan-shaped radiation beam which is directed through a movable diaphragm for sweeping the beam over a subject. The fluoroscopic image resulting therefrom is supplied to an image intensifier which is coupled to a picture recording device which is connected to a display unit for displaying the radiation profile imprinting on the image intensifier. The image recording device contains a solid state image converter which is oriented with respect to the fluorescent screen of the image intensifier. A control unit 17 controls the transmission of the image from the image intensifier to the solid state image converter such that the linear image on the fluorescent screen of the image intensifier, during movement of the X-ray beam, is always detected by the recording region of the solid state image converter.

10 Claims, 1 Drawing Figure

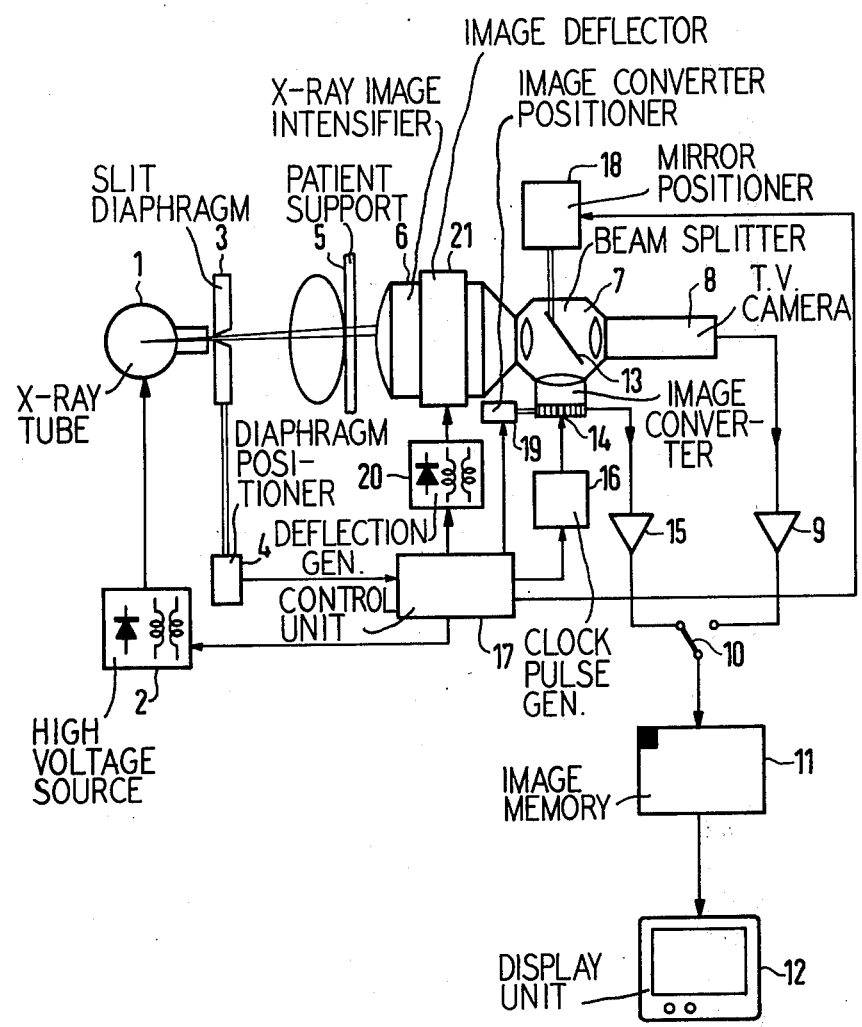

X-RAY DIAGNOSTIC INSTALLATION

BACKGROUND OF THE INVENTION

1. Field of the Invention

The present invention relates to X-ray diagnostic installations, and in particular to such installations employing an X-ray tube for emitting a fan-shaped radiation beam, a means for sweeping the radiation beam across a subject which is disposed transversely to the direction of the radiation beam, an X-ray image intensifier and an image recording device which includes a display unit.

2. Description of the Prior Art

Installations of the type described above are employed for the production of synoptic radiographs. This radiography technique is generally referred to as Scanned Projection Radiography or Computer Radiography (CR).

An X-ray diagnostic installation of this type is described in German patent application P 30 23 401.6. That installation includes a primary radiation diaphragm or collimator mounted on an X-ray tube. A fan-shaped radiation beam is deflected so as to move across a patient and sweeps the input fluorescent screen of an X-ray image intensifier. A linear radiation image is produced on the input fluorescent screen which is transmitted to the output fluorescent screen of the intensifier. A television camera connected to the image intensifier picks up the successive linear images which are converted in a measurand converter into an X-ray shadow image which is displayed on a monitor. In order that only the useful signal, and not a signal produced by stray X-rays, is scanned, a cancelling device is utilized which effects a cancellation of stray X-rays on the target of the television camera directly before the line image. For this purpose the television camera includes a second electron gun for a second scanning beam which proceeds in advance of the image-forming scanning beam. The same result may be achieved with the use of only a single scanning beam, however, a portion of the scanning time must be dedicated to the cancellation of the regions bounding the line image.

SUMMARY OF THE INVENTION

It is an object of the present invention to provide an X-ray diagnostic installation for obtaining CR-images with a high local resolution and a high signal/noise ratio.

It is a further object of the present invention to provide such an X-ray diagnostic installation in which interference patterns and effects produced by stray X-rays in the image intensifier are suppressed in a simple manner.

The above objects are inventively achieved in an X-ray diagnostic installation wherein the image recording device includes a solid state image converter which is oriented with respect to the output fluorescent screen of the X-ray image intensifier and wherein the position of the solid state image converter is controlled by a control unit which also controls transmission of the image from the image intensifier to the image converter in such a manner that the linear image on the output fluorescent screen of the image intensifier, during movement of the X-ray beam, is always detected by the recording or pick-up region of the solid state image converter.

The effects of stray X-rays are substantially eliminated if the solid state image converter is comprised of a linear row of detector elements. The alignment of the solid state image converter with respect to the linear image can be undertaken by means of a displacement device interconnected between the control unit and the image converter which effects a mechanical displacement of the solid state image converter. If the image recording device is coupled to the output fluorescent screen of the image intensifier by means of an optical unit having a mirror disposed in the parallel ray trace, alignment of the image on the image converter can be undertaken by controlled displacement of the mirror, such as by means of a pivot device for moving the mirror through a designated angular range.

Electronic displacement of the X-ray image itself may be undertaken by means of a deflection device surrounding the X-ray image intensifier connected to the control device which displaces the output image of the image intensifier with respect to the input image, so that the linear input image is always approximately produced in the center of the output fluorescent screen. A preferred electronic displacement is achieved with relatively low component outlay in an embodiment wherein the solid state image converter consists of a matrix of semiconductor elements and wherein the control device connected to the solid state image converter effects a linear selection of the semiconductor elements to be read out.

BRIEF DESCRIPTION OF THE DRAWING

The single FIGURE is a schematic representation of an X-ray diagnostic installation constructed in accordance with the principles of the present invention.

DESCRIPTION OF THE PREFERRED EMBODIMENTS

The X-ray diagnostic installation shown in the drawing has an X-ray tube 1 which is fed by a high voltage generator 2. A slit diaphragm 3 is disposed in front of the X-ray tube 1 in the ray trace such that the longitudinal direction of the slit is disposed perpendicularly to the plane of the drawing so that a fan-shaped radiation beam results. The slit diaphragm is transversely displaceable with respect to the longitudinal direction of the slit by a diaphragm position 4.

A patient is disposed in the path of the radiation beam on a patient support device 5 across which the radiation beam sweeps in a longitudinal direction. The resulting image is supplied to the input fluorescent screen of an X-ray image intensifier 6 on which is formed a linear radiation image which is converted into an optical image on the output fluorescent screen of the image intensifier 6. A beam splitter 7 transmits the image to a picture recording means which may include one or more devices for reproducing and displaying the fluoroscopic image. In the embodiment shown in the drawing, the picture recording device includes a television camera 8 and a solid state image converter 14. The output image from the X-ray image intensifier 6 is supplied to both the TV camera 8 and the solid state image converter 14 by means of a semi-reflective mirror 13 contained in the beam splitter 7, which may also contain other optical devices such as lenses necessary for proper focusing of the image.

The television camera 8 is connected to a video amplifier 9 which is in turn connected through a change-over switch 10 to an image memory 11 for eventual display on a display unit 12. The solid state image converter 14 is connected to an amplifier 15 which is also connected to the display unit 12 through the change-over switch 10 and the image memory 11.

The solid state image converter 14 may consist of one linear row of detector elements having a longitudinal direction disposed perpendicularly with respect to the plane of the drawing. The solid state image converter 14 is operated by a clock pulse generator 16 which is in turn controlled by a control unit 17. The control unit 17 also controls the operation of the diaphragm positioner 4 and a mirror positioner 18 for pivoting the mirror 13 through a specified angular range. A synchronous deflection of the fan-shaped X-ray beam and of the linear image is thereby attained so that the linear image, which travels over the output fluorescent screen of the image intensifier 6, is always aligned with respect to the linear solid state image converter 14. The individual line images are read into the image memory 11 line-by-line and are subsequently read out in the form of a television image.

The mirror 13 may be immovably mounted if instead the solid state image converter 14 is mechanically displaced. This can be undertaken by means of a displacement device 19 which is mechanically connected to the solid state image converter 14 and which is operated by the control device 17.

It is also possible to utilize a stationary slit diaphragm 3 in which case the electron beam in the X-ray tube 1 is electronically deflected by controlled operation of the high voltage source 2 by the control unit 17. Deflection of the electron beam in the X-ray tube 1 will effect a displacement of the focus of the beam so that a deflection of the fan-shaped X-ray beam is thus attained.

Orientation of the output image of the image intensifier 6 with respect to the image converter 14 can also be obtained by electronic displacement in which case the solid state image converter 14 consists of a matrix of semiconductor elements which, controlled by the clock pulse generator 16, are linearly switched on and read out synchronously with the deflection of the fan-shaped X-ray beam. For activation of this solid state image converter 14, the clock pulse generator 16 may operate such that one line of the matrix is switched to a radiography receiving state while the preceding line is read out and all remaining lines are cancelled. A complete elimination of interference signals generated by stray rays is thereby achieved.

An electronic deflection of the image may also be achieved with respect to the solid state image converter 14, which may in this case again be a linear converter, by means of a deflection generator 20 interconnected between the control device 17 and an image deflector 21 which is arranged around the X-ray image intensifier 6 and which effects a deflection of the electron beams in the image intensifier 6. The image deflector 21 may be a magnetic deflection device or an electrostatic deflection device with electrodes in the X-ray image intensifier 6.

If the television camera 8 is employed in addition to the solid state image converter 14, the X-ray diagnostic installation can be switched between a normal fluorescopy operation and a CR-operation by means of the change-over switch 10. A special CR-apparatus is thus not necessary.

By the utilization of a solid state image converter, radiographs with a large signal/noise ratio can be produced because the solid state image converter exhibits a substantially higher dynamic contrast range than does a conventional video tube. The signal/noise ratio of the installation disclosed herein is further improved in comparison with conventional installations because the X-ray image intensifier through its high intrinsic intensification generates a higher power output signal.

Although modifications and changes may be suggested by those skilled in the art it is the intention of the inventor to embody within the patent warranted hereon all changes and modifications as reasonably and properly come within the scope of his contribution to the art.

I claim as my invention:

1. An X-ray diagnostic installation comprising:
   an X-ray tube for emitting a fan-shaped radiation beam;
   an X-ray image intensifier having an input fluorescent screen and an output fluorescent screen;
   a patient support means disposed between said X-ray tube and said X-ray image intensifier;
   a means disposed in front of said X-ray tube for generating movement of said radiation beam for sweeping said beam over a subject on said support device;
   an image recording means connected to the output of said image intensifier, said image recording means having a solid state image converter optically coupled to said output fluorescent screen of said image intensifier, said solid state image converter having a recording region;
   a control means connected to at least one of said means for generating movement of said radiation beam, said image intensifier or said image converter for controlling transmission of the image from said image intensifier to said image converter such that a linear image on said output fluorescent screen of said image intensifier during movement of said radiation beam is always directed at said recording region of said image converter; and
   a display unit connected to said image recording device for visually displaying a reproduction of the output of said image intensifier.

2. The X-ray diagnostic installation of claim 1 wherein said solid state image converter is comprised of a linear row of a plurality of detector elements.

3. The X-ray diagnostic installation of claim 1 further comprising an image converter positioner mechanically connected to said image converter and electrically connected to said control means for mechanically displacing said image converter in response to signals received from said control means.

4. The X-ray diagnostic installation of claim 1 wherein said image recording device has a mirror for directing the image on said output fluorescent screen of said image intensifier to said image converter and further comprising a mirror positioner mechanically connected to said mirror and electrically connected to said control means for selectively positioning said mirror for positioning said image on said image converter in response to signals from said control means.

5. The X-ray diagnostic installation of claim 1 further comprising a deflection generator interconnected between said control means and said image intensifier for displacing the image on said output fluorescent screen of said image intensifier with respect to the image on said input fluorescent screen such that the image from said input fluorescent screen is directed approximately in a center of said output florescent screen.

6. The X-ray diagnostic installation of claim 5 wherein said deflection device is a magnetic deflection device.

7. The X-ray diagnostic installation of claim 5 wherein said deflection device is an electrostatic deflection device.

8. The X-ray diagnostic installation of claim 1 wherein said solid state image converter consists of a matrix of semiconductor elements and wherein said control device is connected to said solid state image converter for linearly selecting one or more of said semiconductor elements for readout thereof.

9. The X-ray diagnostic installation of claim 1 further comprising a positioner means interconnected between said control means and said means for generating movement of said X-ray beam for moving said means for generating means for said movement of said radiation beam in response to signals from said control means.

10. The X-ray diagnostic installation of claim 1 wherein said image recording device further has a television camera for generating a video image from the image on said output fluorescent screen of said image intensifier, and wherein said installation further comprises a change-over switch interconnected between said solid state image converter and said television camera and said display unit for selectively displaying an image from either said television camera or said image converter on said display unit.

* * * * *